(12) United States Patent
Gypen

(10) Patent No.: US 6,476,964 B1
(45) Date of Patent: Nov. 5, 2002

(54) ENAMELLED PROJECTION SCREEN AND METHOD FOR THE MANUFACTURING THEREOF

(75) Inventor: Leo Gypen, Genk (BE)

(73) Assignee: Poly Vision, naamloze vennootschap, Genk (BE)

( * ) Notice: Subject to any disclaimer, the term of this patent is extended or adjusted under 35 U.S.C. 154(b) by 0 days.

(21) Appl. No.: 09/736,016

(22) PCT Filed: Jun. 22, 1999

(86) PCT No.: PCT/BE99/00078

§ 371 (c)(1),
(2), (4) Date: Dec. 18, 2000

(87) PCT Pub. No.: WO00/00666

PCT Pub. Date: Jan. 6, 2000

(30) Foreign Application Priority Data

Jun. 26, 1998 (BE) ................................. 9800488

(51) Int. Cl.⁷ .......................... G03B 21/56; G03B 21/60
(52) U.S. Cl. ....................... 359/443; 359/452
(58) Field of Search ................ 359/443, 449, 359/452, 460

(56) References Cited

U.S. PATENT DOCUMENTS

| 2,944,462 A | 7/1960 | Harkness | 359/452 |
| 3,273,455 A | 9/1966 | Kaufmann | 428/213 |
| 3,846,011 A | 11/1974 | Stein | 359/460 |
| 5,266,107 A | 11/1993 | Hoffman | 106/415 |
| 5,361,163 A | * 11/1994 | Matsuda et al. | 359/452 |

FOREIGN PATENT DOCUMENTS

| DE | 34 03 861 A | 8/1985 |
| DE | 35 07 595 A | 9/1986 |
| EP | 0220 509 A | 5/1987 |
| FR | 679 803 A | 4/1930 |
| GB | 813 920 A | 5/1959 |
| JP | 64-33031 | * 2/1989 |
| JP | 64-36775 | * 2/1989 |

OTHER PUBLICATIONS

Database WPI Section Ch, Week 8911, Derwent Publications Ltd., London, XP992114907 and JP 01 033031 A, Feb. 2, 1989, Kawatetsu Kinzoku Kogyo, Abstract.
Database WPI Section Ch, Week 8911, Derwent Publications Ltd., London, XP002114908 & JP 01 036775, Feb. 7, 1989, Kawatetsu Kinzoku Kogyo, Abstract.
Patent Abstracts of Japan, Nov. 25, 1988, & JP 63 176334 A, Jul. 20, 1988, Nippon Fueroo KK, Abstract.
Patent Abstracts of Japan, Sep. 10, 1990, & JP 02 160638 A, Jun. 20, 1990, NGK Insulators LTD; Others:01.
Database WPI, Section Ch, Week 9029, Derwent Publications Ltd., London, XP002114909, & JP 02 153080 A, Jun. 12, 1990, Kawatetsu Kinzoku K., Abstract.

* cited by examiner

*Primary Examiner*—Christopher Mahoney
(74) *Attorney, Agent, or Firm*—Bacon & Thomas

(57) ABSTRACT

The enamelled projection screen includes a substrate which is coated with at least one enamel layer which includes a pearlescent pigment and the gloss degree of which is between 1 and 40% on the 60° measuring head according to the ISO 2813 standard. This screen is manufactured by applying an enamel slurry on a substrate and burning it in at a high temperature, whereby, before the burning-in takes place, a quantity, preferably between 0.5 and 50 weight % in respect to the quantity of enamel in dry form, of a pearlescent pigment is added to the enamel slurry. The contents of pearlescent pigment are chosen sufficiently high and the temperature of burning-in sufficiently low in order to obtain the aforementioned gloss degree.

18 Claims, No Drawings

ENAMELLED PROJECTION SCREEN AND METHOD FOR THE MANUFACTURING THEREOF

This invention relates to an enamelled projection screen comprising a substrate, coated with at least one enamel layer.

Such projection screens are used as a substitute for the classic projection fabrics or lacquered substrates as they have better mechanical properties, in particular a very good resistance against scratches and incisions, and are resistive against heat and smoke.

A disadvantage of a number of lacquered, so-called "high-gain" projection screens is that, during a presentation, the persons which are present in the middle of the projection room and thus directly opposite the projection screen, will see a good image on the screen, but persons which are present at the edges of the projection room and, thus, view the screen under a sharp angle, will get the impression that the screen is dark, in consideration of the fact that the light is reflected away from them.

The invention aims at an enamelled projection screen which can be manufactured relatively simple, has an even better projection quality than the aforementioned screens, and this without any notable colour distorsion, and which offers a very good image quality even with sharp angles of view with respect to the screen, without disturbing influences of light sources or window reflections.

According to the invention, this aim is achieved in that the enamel layer comprises pearlescent pigment and the gloss degree of the enamel layer is situated between 1 and 40% on the 60 measuring head according to the ISO 2813 standard.

Nacreous pigment, called "pearlescent" pigment, is known in itself and on the market. Such pigment is used in colours, in synthetic material and in cosmetics in order to obtain a special colour, gloss and possibly a metallic appearance.

Pearlescent pigments follow the same laws of reflection as smooth surfaces, but the pigment particles are not only smooth, but transparent, too.

This means that only a part of the light is reflected. The part which is not reflected is passed through the pigment particle up to the following layer, where it can be reflected further. These multiple reflections of a large number of layers cause the special reflection effect.

Preferably, the enamel layer comprises 0.5 to 50 g pearlescent pigment per 100 g enamel in dry form.

This enamel itself may consist of a mixture of a transparent enamel and an opaque enamel.

The invention also relates to a method which allows to manufacture the aforementioned enamelled projection screen according to the invention in a simple manner.

The invention thus relates to a method for manufacturing an enamelled projection screen, whereby an enamel slurry is applied on a substrate and is fired on a high temperature, and which is characterized in that, before firing takes place, a quantity, preferably between 0.5 and 50 weight % in respect to the quantity of enamel in dry form, of a pearlescent pigment is added to the enamel slurry and the contents of pearlescent pigment are chosen sufficiently high and the temperature of firing sufficiently low, as the enamel layer shall have a gloss degree between 1 and 40% on the 60° measuring head according to the ISO 2813 standard.

With the intention of better showing the characteristics of the invention, preferred forms of embodiment of an enamelled projection screen and of a method for the manufacturing thereof according to the invention are represented hereafter, as an example without any limitative character.

An enamelled projection screen according to the invention substantially consists of a substrate in the form of a steel plate which, in a known manner, is coated with an enamel ground coat, and of an enamel layer, in which pearlescent pigment is included, which is fired thereupon at a high temperature.

Suitable pearlescent pigments consist of mica platelets which are coated with $TiO_2$ or $Fe_2O_3$, or of platelets of BiOCl or lead carbonate and are manufactured, amongst others, by "E. Merck" (U.S.A.).

The quantity of pearlescent pigment amounts to 0.5 to 50 weight % of the enamel layer in which it is incorporated.

The inclusion of these pigments results in a high reflection of the incident light, in consideration of the fact that they are not absorbing, but reflecting, contrary to the conventional pigments.

Light-grey or white pearlescent pigments are preferred, in consideration of the fact that light colours have a lower light absorption in comparison to dark colours.

This light-grey or white colour can be obtained by choosing, for example, with a titanium dioxide coating of mica particles, the layer thickness of the titanium dioxide coating in an appropriate manner.

The gloss degree of the enamel layer is situated between 1 and 40% on the 60 measuring head according to the ISO 2813 standard, as a result of which the surface is sufficiently mat and the reflected light, by irregularities of the surface, is spread sufficiently diffuse to avoid window reflections and strong reflections ("hot spots") of light sources and projection sources.

In order to manufacture this projection screen, the pearlescent pigment is mixed at room temperature into the enamel slurry which is subsequently, by wet spraying or another application technique, applied on the substrate and is finally fired onto this substrate in an oven, at a high temperature, for example, 800° C.

The gloss degree depends on the contents of pearlescent pigment and on the firing temperature.

In the table following hereafter, the gloss degree in % on the 60° measuring head according to the ISO 2813 standard is represented for several firing temperatures and pigment contents.

The contents of pearlescent pigment is chosen sufficiently high and the temperature of firing sufficiently low, as the enamel layer shall have the above-mentioned desired gloss degree and, thus, shall be mat.

This leads to non-porous enamel layers which, irrespective of the low gloss degree, still can be cleaned well, dry or wet, and thus combine an easy maintenance with durability and high serviceable life.

Thus, the gloss degrees which are represented parenthetically in the table are not according to the invention.

| Temperature in ° C. | Pearlescent pigment | | |
|---|---|---|---|
| | 5 weight % | 15 weight % | 25 weight % |
| 640 | 4.6 | 3.7 | — |
| 660 | 8.2 | 4.0 | — |
| 680 | 11.8 | 4.2 | — |
| 700 | 22.2 | 4.8 | — |
| 720 | 35.1 | 6.3 | 5.9 |
| 740 | (58.9) | 8.2 | 5.4 |
| 760 | (71.3) | 9.6 | 5.8 |

-continued

| Temperature | Pearlescent pigment | | |
|---|---|---|---|
| in ° C. | 5 weight % | 15 weight % | 25 weight % |
| 780 | (88.3) | 15.2 | 6.6 |
| 800 | (101.3) | (59.2) | 19.8 |
| 820 | — | — | 27.7 |
| 840 | — | — | (54.8) |

If the contents of pearlescent pigment are relatively low, this enamel, as the covering capacity of the applied enamel in the enamel slurry shall be sufficiently high, practically exclusively has to be opaque pigment enamel.

With sufficiently high contents of pearlescent pigment, the enamel composition may consist partially of opaque and partially of transparent enamel, in consideration of the fact that the covering capacity is provided to a major extent by the pearlescent pigment itself. With high contents of pearlescent pigment, the enamel may consist to a great extent of transparent enamel and, for example, represent 50 to 100% of the total quantity of enamel.

It is possible to add conventional absorbing colour pigments, but the quantity of absorbing an organic pigments must be limited in order to keep the high light efficiency.

The obtained projection screen offers a very good light efficiency and projection quality and an excellent image quality without notable colour distortion, even with extremely sharp viewing angles with respect to the screen.

It has a high scratch resistance, wear resistance and durability, is an inert material and easy to maintain and is resistant against smoke and burning cigarettes. Writings which can be wiped off dry or wet are possible.

The projection screen is suitable for various projections, such as LCD computer projection, video projection, overhead LCD or normal overhead projection, RGB projection, slide projection, daylight projection, internet projection, and projection of television or home theatre on projection screen.

The invention will be illustrated in greater detail by the following practical example:

An enamel slurry was made with:
20 g titanium dioxide opaque enamel
80 g transparent enamel
6.5 g clay
60 g water
0.15 g sodium aluminate After milling, to this enamel slurry were added 15 g white pearlescent pigment, consisting of mica particles coated with titanium dioxide with an average diameter of 10 micrometer, after which, by means of a high-speed mixer, a uniform dispersion was manufactured.

This dispersion was sprayed upon a substrate, consisting of a steel plate which had already been enamelled with a ground coat.

The whole was fired in an oven up to 785° C.

The thus obtained projection screen showed a very good projection quality for a very broad viewing angle, without any "hot spot" formation during projection. The gloss degree was 20 on a 60 measuring head according to the ISO 2813 standard.

The projection screen could be cleaned wet very good, had an excellent acid resistance (class 1 according to the ISO 2722 standard), a high scratch resistance (4 on the Mohs' scale according to EN 100), and a very high wear resistance (0.19 g weight loss according to the Taber test ASTM C501, grinding paper S33, 1000 revolutions and 1 kg load).

With respect to screens with a projection surface enamelled mat white without pearlescent pigments, the screen according to the invention has the advantage that the vertical brightness ("gain") of its projection surface is higher.

The invention is in no way limited to the forms of embodiment described heretofore, on the contrary may such projection screen and such method for the manufacturing thereof be realized in various variants without leaving the scope of the invention.

What is claimed is:

1. Enamelled projection screen comprising a substrate coated with at least one enamel layer, characterized in that the enamel layer comprises pearlescent pigment and the gloss degree of the enamel layer is situated between 1 and 40% on the 60° measuring head according to the ISO 2813 standard.

2. Enamelled projection screen according to claim 1, characterized in that the pigment consists of mica platelets, coated with $TiO_2$ or $Fe_2O_3$, or of BiOCl or lead carbonate.

3. Enamelled projection screen according to claim 1, characterized in that the enamel layer comprises 0.5 to 50 g pearlescent pigment per 100 g enamel in dry form.

4. Enamelled projection screen according to claim 1, characterized in that the enamel layer comprises an enamel consisting of a mixture of, on one hand, a transparent enamel and, on the other hand, an opaque enamel, in a weight ratio of 80/20.

5. Enamelled projection screen according to claim 1, characterized in that the substrate is made of metal.

6. Enamelled projection screen according to claim 5, characterized in that the substrate is a metal plate which is provided with an enamel ground coat.

7. Method for manufacturing an enamelled projection screen, whereby an enamel slurry is applied upon a substrate and is fired at a high temperature, characterized in that, before firing takes place, a quantity, preferably between 0.5 and 50 weight % in respect to the quantity of enamel in dry form, of a pearlescent pigment is added to the enamel slurry and the contents of pearlescent pigment are chosen sufficiently high and the temperature of firing sufficiently low, as the enamel layer shall have a gloss degree between 1 and 40% on the 60° measuring head according to the ISO 2813 standard.

8. Method according to claim 7, characterized in that an enamel slurry is used comprising enamel which partially consists of opaque and partially of transparent enamel.

9. Method according to claim 8, characterized in that the enamel slurry comprises a quantity of transparent enamel which represents 50 to 100% of the total quantity of enamel.

10. Method according to claim 7, characterized in that the enamel slurry is applied on a steel plate which is already provided with an enamel ground coat.

11. Enamelled projection screen according to claim 2, characterized in that the enamel layer comprises 0.5 to 50 g pearlescent pigment per 100 g enamel in dry form.

12. Enamelled projection screen according to claim 2, characterized in that the enamel layer comprises an enamel consisting of a mixture of, on one hand, a transparent enamel and, on the other hand, an opaque enamel, in a weight ratio of 80/20.

13. Enamelled projection screen according to claim 3, characterized in that the enamel layer comprises an enamel consisting of a mixture of, on one hand, a transparent enamel and, on the other hand, an opaque enamel, in a weight ratio of 80/20.

14. Enamelled projection screen according to claim 2, characterized in that the substrate is made of metal.

15. Enamelled projection screen according to claim 3, characterized in that the substrate is made of metal.

16. Enamelled projection screen according to claim 4, characterized in that the substrate is made of metal.

17. Method according to claim 8, characterized in that the enamel slurry is applied on a steel plate which is already provided with an enamel ground coat.

18. Method according to claim 9, characterized in that the enamel slurry is applied on a steel plate which is already provided with an enamel ground coat.

* * * * *